United States Patent [19]
Hong

[11] Patent Number: 5,339,104
[45] Date of Patent: Aug. 16, 1994

[54] MOTION DETECTING APPARATUS

[75] Inventor: Sam P. Hong, Kyungsangbook, Rep. of Korea

[73] Assignee: Goldstar Co., Ltd., Seoul, Rep. of Korea

[21] Appl. No.: 987,690

[22] Filed: Dec. 9, 1992

[30] Foreign Application Priority Data

Dec. 9, 1991 [KR] Rep. of Korea ............... 22501/1991

[51] Int. Cl.[5] ........................................... H04N 7/18
[52] U.S. Cl. ..................... 348/155; 348/596; 348/700
[58] Field of Search .................. 358/105, 108; H04N 7/18

[56] References Cited

U.S. PATENT DOCUMENTS 4,458,266  7/1984  Mahoney .................. 358/105
4,774,570  9/1988  Araki ...................... 358/105

Primary Examiner—Howard W. Britton

[57] ABSTRACT

A motion detection apparatus capable of editing a monitoring range and of adjusting the motion indication and the indication level, which includes an analog/digital converter, a synchronous separator, a system clock generator, a microcomputer, a memory control and address generator, a picture memory and motion comparator, a level comparing and motion output controller, an alarm output controller, a window control and marker indication controller, and a picture synthesizer.

20 Claims, 9 Drawing Sheets

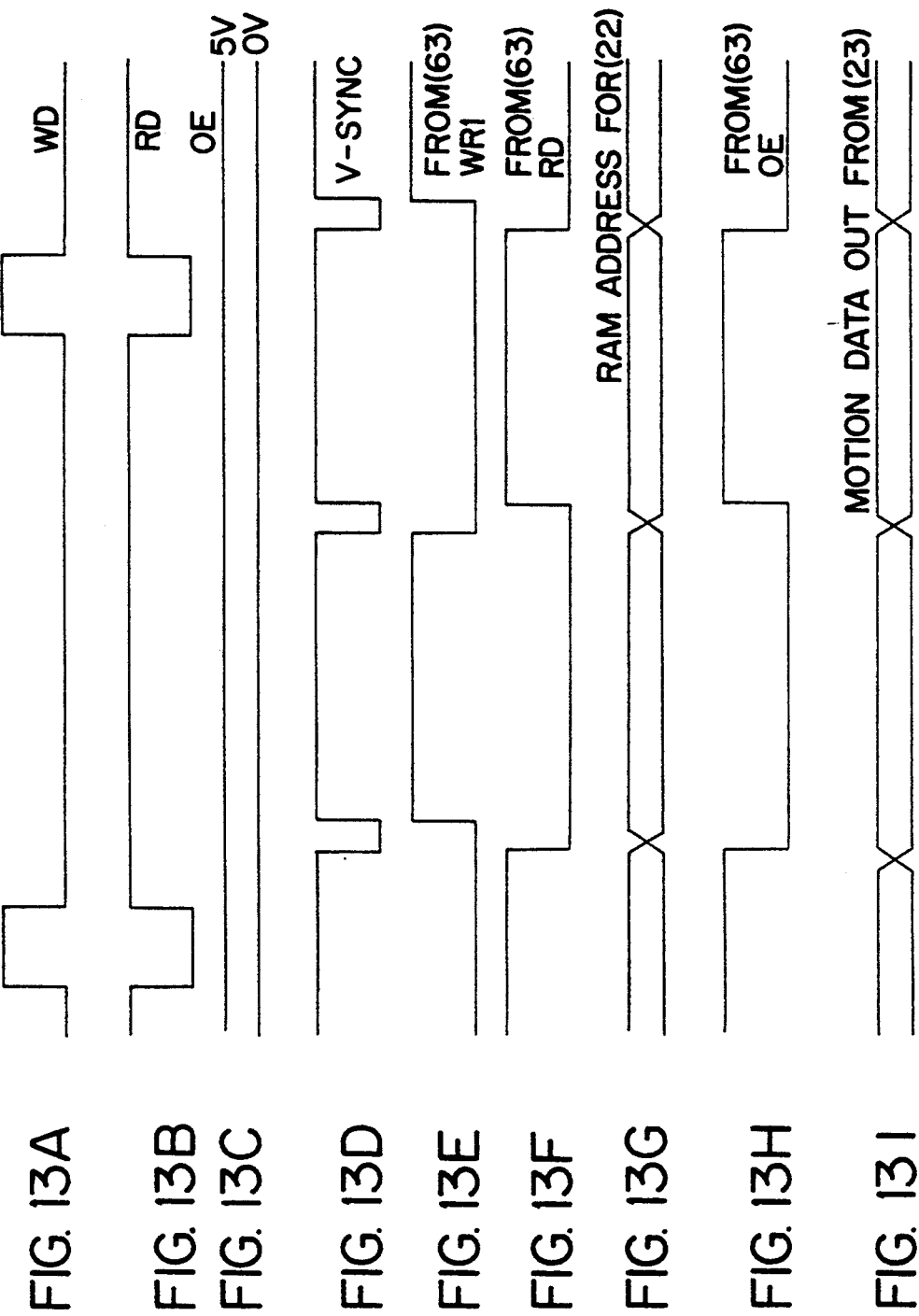

MOTION DETECTING APPARATUS

BACKGROUND OF THE INVENTION

1. Field of the Invention

The present invention relates to a motion detecting apparatus for use in a closed circuit television, and more particularly to a motion detecting apparatus which is capable of editing a region of which the motion is to be monitored and adjusting a motion indication and an indication level.

2. Description of the Prior Art

Generally, in the closed circuit television (CCTV) a motion is detected by comparing a video signal obtained by a monitor camera with a mean valve and the detected motion is displayed on a screen. One conventional motion detecting apparatus for use in a CCTV is illustrated in FIG. 1. As shown in FIG. 1, the conventional motion detecting apparatus comprises a first and a second analog/digital converters $1a$ and $1b$ for converting an inputted video signal and a video signal delayed by one frame into a digital video signal, respectively, a frame or field comparator 3 for comparing the digital video signal of current frame and the one frame-delayed digital video signal both being outputted from the analog/digital converters $1a$ and $1b$ by frame or field and detecting the difference signal therebetween, a synchronous separator 2 for separating and detecting a synchronous signal of the input video signal, a window and marker indicator 5 for controlling a window indicating a motion detection region of which the size and position are determined by variable resistors VR2 and VR3 and a marker indication of a motion point in response to the synchronous signal of the synchronous separator 2, a memory and address controller 4 for generating a memory control and address control signal for detecting a motion and controlling the frame or field comparator 3 in response to the synchronous signal of the synchronous separator 2, a digital/analog converter 6 for converting the difference signal of the frame or field comparator 3 into an analog signal, a level comparator 7 for comparing the output signal from the digital-/analog converter 6 with a reference level which is set by a variable resistor VR1 and outputting a motion signal, an alarm output controller 8 for outputting an alarm signal to a speaker (not shown) in response to the motion signal of the level comparator 7, a superimposer 9 for outputting a video signal, and a system clock signal generator $9a$ for generating a system clock signal which is required by the superimposer 9, the memory and address controller 4 and the window and marker indication controller 5.

In such a conventional motion detecting apparatus, a video signal from a monitor camera (not shown) is inputted to the first and second analog/digital converters $1a$ and $1b$, the synchronous separator 2 and the superimposer 9. The first and second analog/digital converters $1a$ and $1b$ convert the currently inputted video signal and a video signal which has been inputted to a previous frame and is delayed by one frame into digital video signals to the frame or field memory 3. And the synchronous separator 2 separates a synchronous signal from the input video signal and applies the synchronous signal to the memory and address controller 4 and the window and marker indicator 5.

At this moment, the window and marker indicator 5 may vary the size of the window, which is a motion monitoring region, by the variable resistors VR2 and VR3. Also, the size of the marker may be varied by the window and marker indicator 5. At this moment, the shape of the window is set to a rectangular or a square type.

Thereafter, the frame or field comparator 3 compares the video signal of previous frame with the video signal of current frame at every frame and outputs a difference signal therebetween upon the control of the memory and address controller 4. And then, the difference signal between the current frame video signal and the previous frame video signal is converted into an analog signal by the digital/analog converter 6. That is, the difference signal is converted into a direct current level signal through an integral circuit. The output signal from the digital/analog converter 6 is compared with a reference level, which is set by the variable resistor VR1, at the level comparator 7 so that a motion detection signal is outputted. The motion detection signal is applied to the alarm output controller 8 to drive the speaker, thereby making an alarm in response to the motion detection.

However, the conventional motion detecting apparatus has disadvantages in that since the motion detection level or the window region are adjusted by a volume control, it is impossible to freely adjust and vary the size and position of window which indicates the region to be monitored, and the marker which indicates the motion is limited in its position and size, and a detection error may occur due to a temperature drift.

There has also been disadvantage in that since the motion is detected by comparing the input video signal with the mean value, a detection error may occur in the video signal of rapid motion.

SUMMARY OF THE INVENTION

Accordingly, it is an object of the present invention to provide a motion detecting apparatus for use in a CCTV which is capable of editing a region to be monitored.

In the present invention, the detection of motion is carried out by comparing a video signal of privous field with a video signal of current field to obtain a difference therebetween. In addition, a microcomputer generates and selects a window address and indication data so as to enable a window edition. And, in editing the window, a cursor is displayed at the editing position so that the user may curry out the window edition while seeing the position.

Briefly described, the present invention relates to a motion detecting apparatus for use in a CCTV which includes an analog/digital converter for sampling a video signal inputted from a charge-coupled device camera and converting the sampled signal into a digital signal, a synchronous separator for separating said video signal into a horizontal synchronous signal and a vertical synchronous signal, a system clock generator for generating a system clock signal by a quartz-crystal oscillator, a microcomputer for controlling a motion detection, a window/marker indication and a window edition in response to key signals from a key board, a memory control and address generator for receiving the horizontal synchronous signal and vertical synchronous signal from said synchronous separator and outputting an address and control signal for determining an effective sampling region and a motion comparing region upon the control of said microcomputer, a picture momory and motion comparator for receiving the digitized video signal from said analog/digital converter and detecting a motion of image by comparing previously inputted field data and currently inputted field data upon the control of said memory control and address generator, a level comparing and motion output controller for comparing the motion detection data from said picture memory and motion comparator with a limit value and a reference value and controlling a motion output, an alarm output controller for outputting an alarm control signal to an external controller when the result of level comparison at said level comparing and motion output controller exceeds the limit value, a window control and marker indication controller for controlling a window and a marker indication in response to an address signal for designating a magnitude of a window/marker of said memory control and address generator and a window/marker selection control signal of the microcomputer upon receipt of a motion output signal from the level comparing and motion output controller, and a picture synthesizer for synthesizing the output signal from said window control and marker indication controller and the video input signal and outputting a video signal indicated with a window or a marker.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13A to FIG. 13I are waveform views of each section of the motion detecting apparatus of the present invention.

DESCRIPTION OF THE PREFERRED EMBODIMENTS

Figure 1:
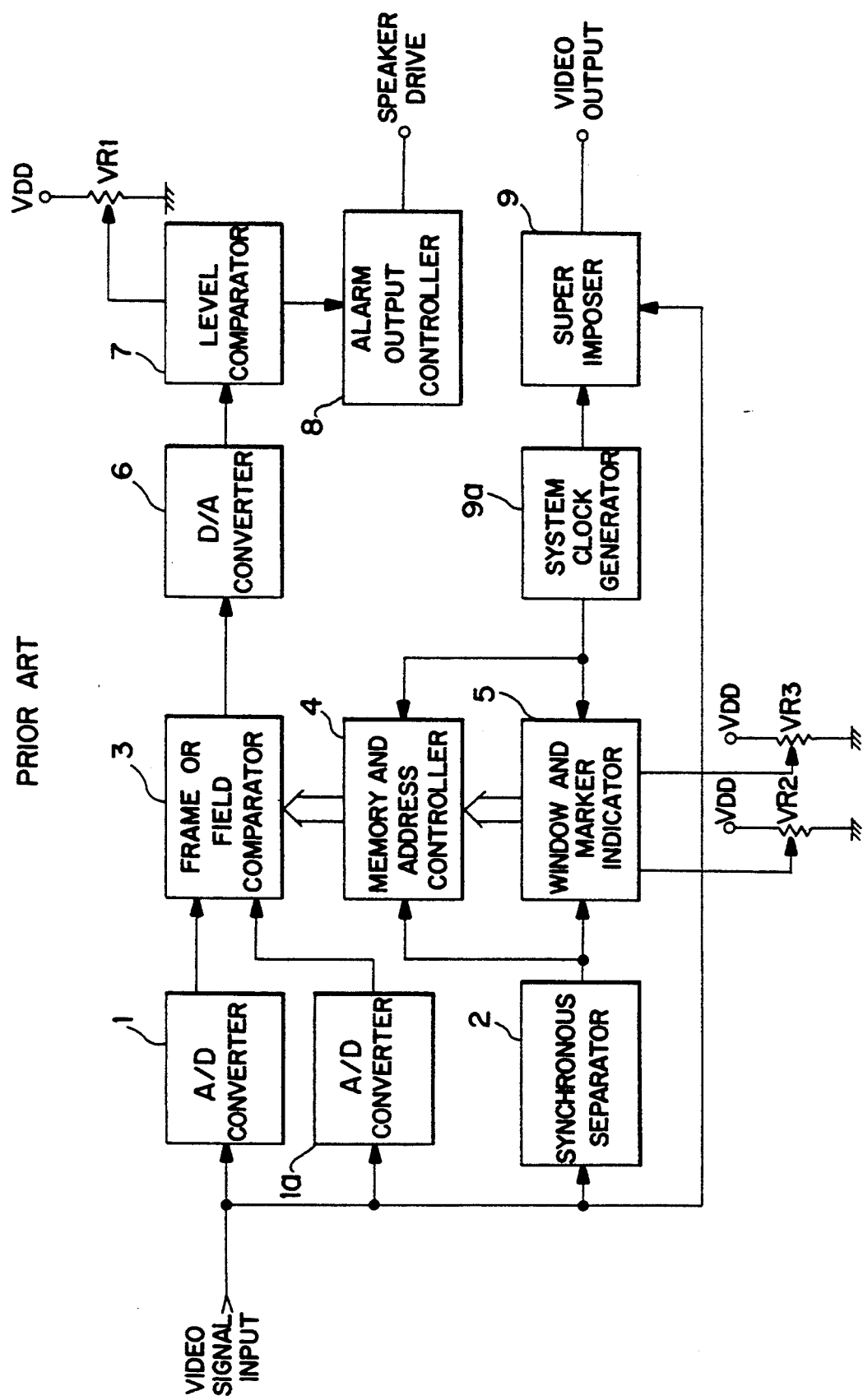
FIG. 1 is a block diagram of a conventional motion detecting apparatus.
Figure 2:
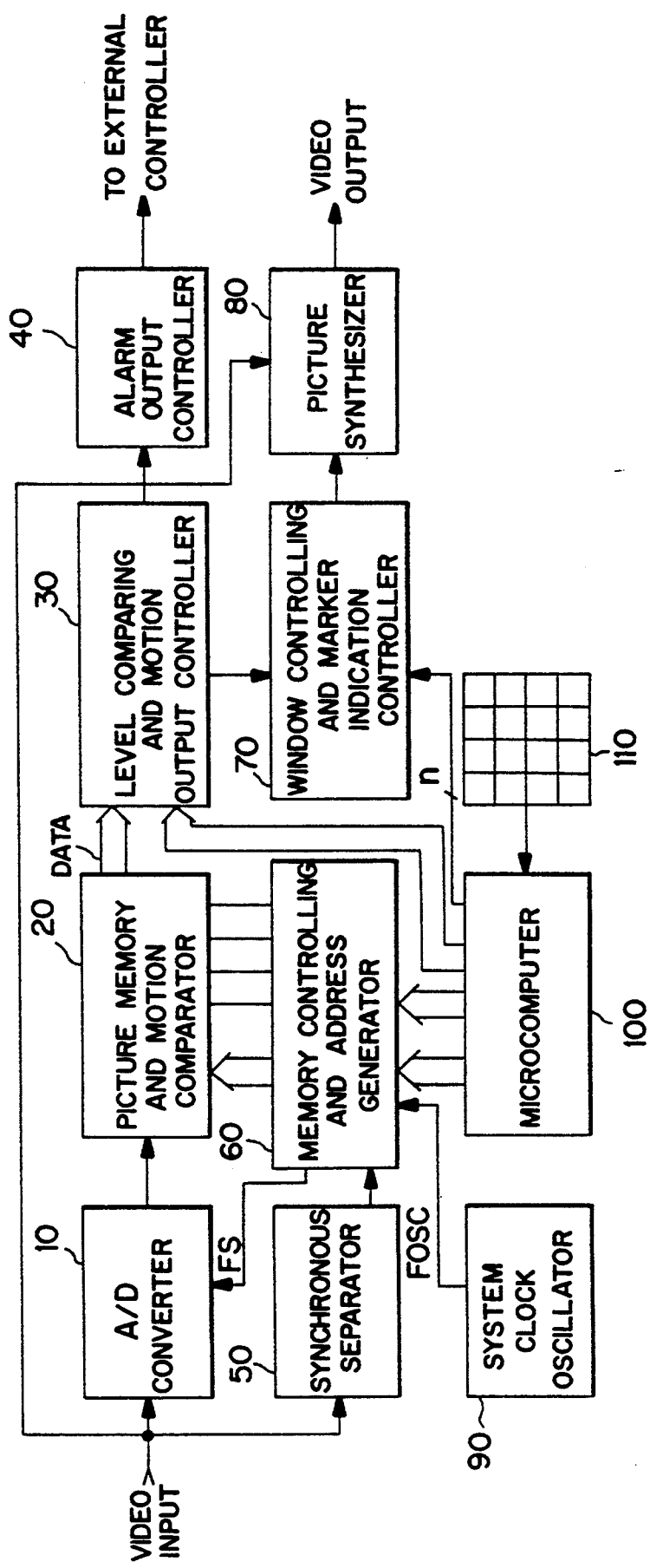
Fig. 2 is a block diagram of a motion detecting apparatus of the present invention.

Referring now in detail to the drawings for the purpose of illustrating preferred embodiments of the present invention, the motion detecting apparatus as sown in FIG. 2, which comprises an analog/digital converter 10 for sampling a video signal inputted from a charge-coupled device (CCD) camera and converting the sampled signal into a digital signal, a synchronous separator 50 for separating said video signal into a horizontal synchronous signal HD and a vertical synchronous signal VD, a system clock generator 90 for generating a system clock signal (fosc) by a quartz-crystal oscillator X-tal, a microcomputer 100 for controlling each section for a motion detection, a window/marker indication and a window edition in response to key signals from a key board 110, a memory control and address generator 60 for receiving the horizontal synchronous signal HD and vertical synchronous signal VD from said synchronous separator 50 and outputting an address and control signal for determining an effective sampling region and a motion comparing region upon the control of said microcomputer, a picture momory and motion comparator 20 for receiving the digitized video signal from said analog/digital converter 10 and detecting a motion of image by comparing previously inputted field data and currently inputted field data upon the control of said memory control and address generator 60, a level comparing and motion output controller 30 for comparing the motion detection data from said picture memory and motion comparator 20 with a limit value and a reference value and controlling a motion output, an alarm output controller 40 for outputting an alarm control signal to an external controller when the result of level comparison at said level comparing and motion output controller 30 exceeds the limit value, a window control and marker indication controller 70 for controlling a window and a marker indication in response to an address signal for designating a magnitude of a window/marker of said memory control and address generator 60 and a window/marker selection control signal of the microcomputer 100 upon receipt of a motion output signal from the level comparing and motion output controller 30, and a picture synthesizer 80 for synthesizing the output signal from said window control and marker indication controller 70 and the video input signal and outputting a video signal indicated with a window or a marker.

Figure 3:
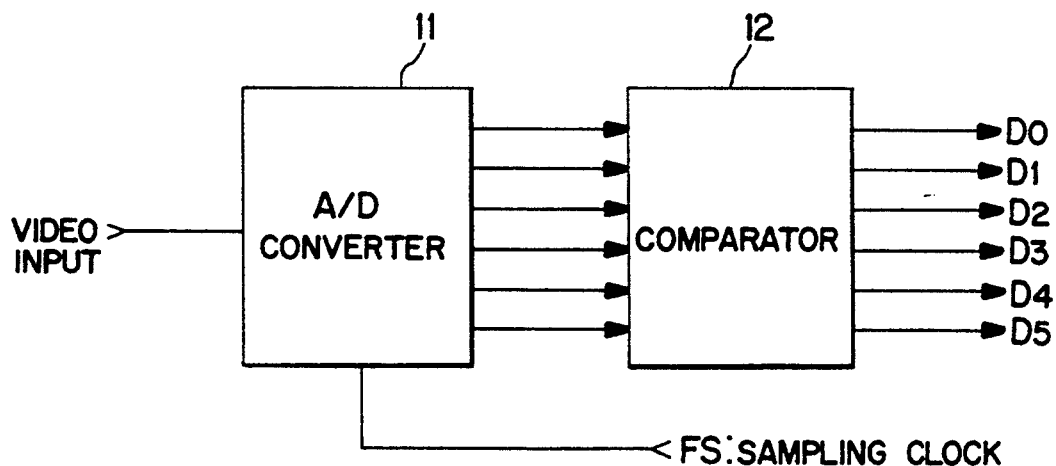
FIG. 3 is a diagram showing an analog/digital converter section of the motion detecting apparatus of the present invention.

The analog/digital converter 10, as shown in FIG. 3, includes an analog/digital converter 11 for converting an analog video signal into digital video data in response to an effective sampling signal (fs) which is applied from the memory control and address generator 60, and a comparator 12 for comparing a 6 bit output data from the analog/digital converter 11 with a reference value and outputting shaped video data D0–D5.

Figure 4:
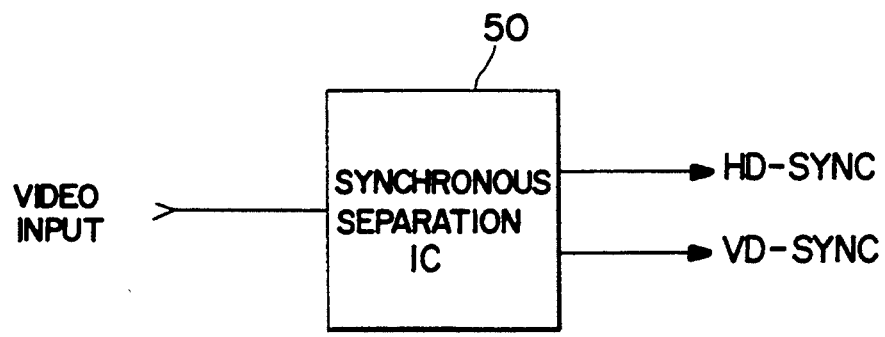
FIG. 4 is a diagram showing a synchronous separator section of the motion detecting apparatus of the present invention.

The synchronous separator, as shown in FIG. 4, includes a synchronous separating IC for separating and outputting the horizontal synchronous signals HD-SYNC and vertical synchronous signals VD-SYNC of the input video signal.

Figure 5:
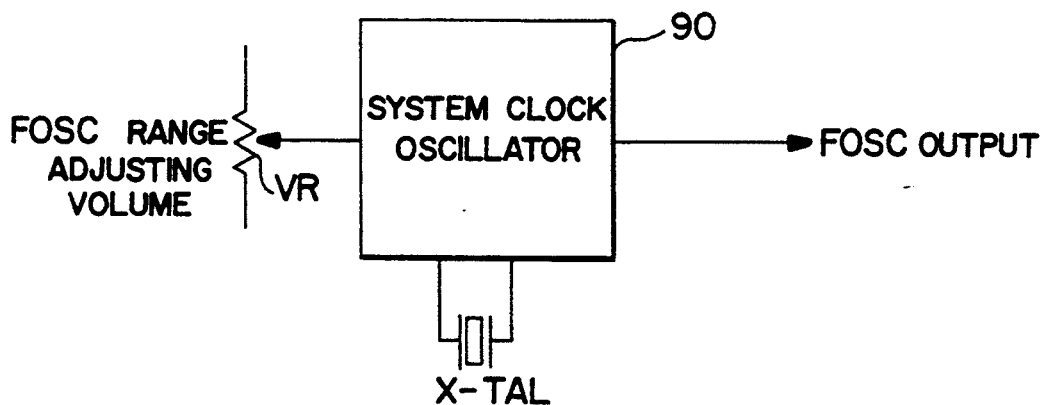
FIG. 5 is a diagram showing a system clock separator section of the motion detecting apparatus of the present invention.

The system clock generator, as shown in FIG. 5, is constructed such that a frequency range of a frequency signal, which is oscillated by a quartz-crystal oscillator X-tal, is adjusted by a variable resistor VR so that a system frequency signal (fosc) is outputted.

Figure 6:
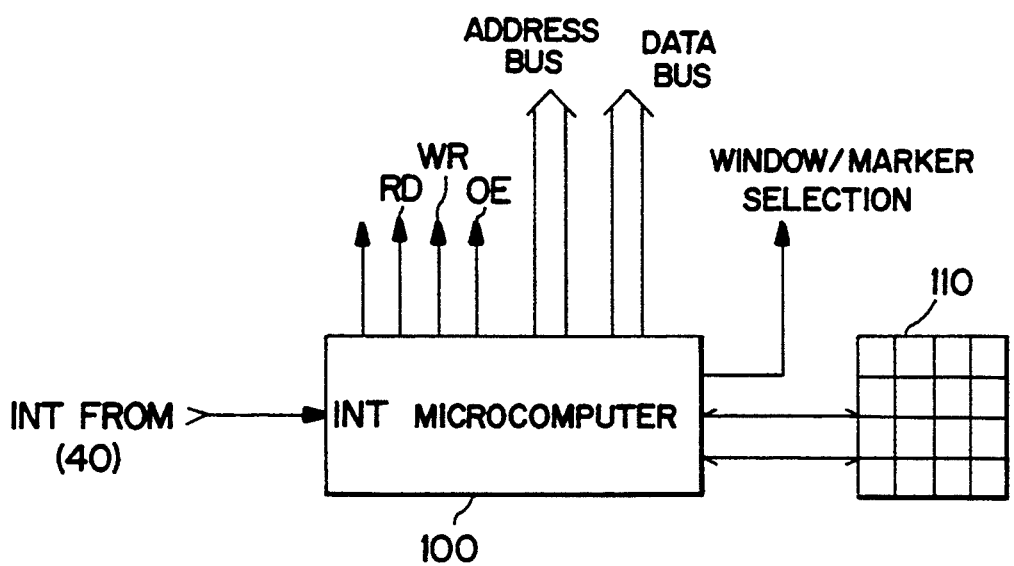
Fig. 6 is a diagram showing input/output signals of a microcomputer of the motion detecting apparatus of the present invention.

The microcomputer 100, as shown in FIG. 6, is constructed such that it receives an alarm drive signal as an interrupt signal INT from the alarm output controller 40, receives a key signal from the key board 110 to output an address control signal, a read signal RD, a write signal WR and an output enable signal OE of the memory control and address generator 60, an address signal through an address bus, and control data through a data bus, and outputs a window/marker selection signal to the window control and marker indication controller 70.

Figure 8:
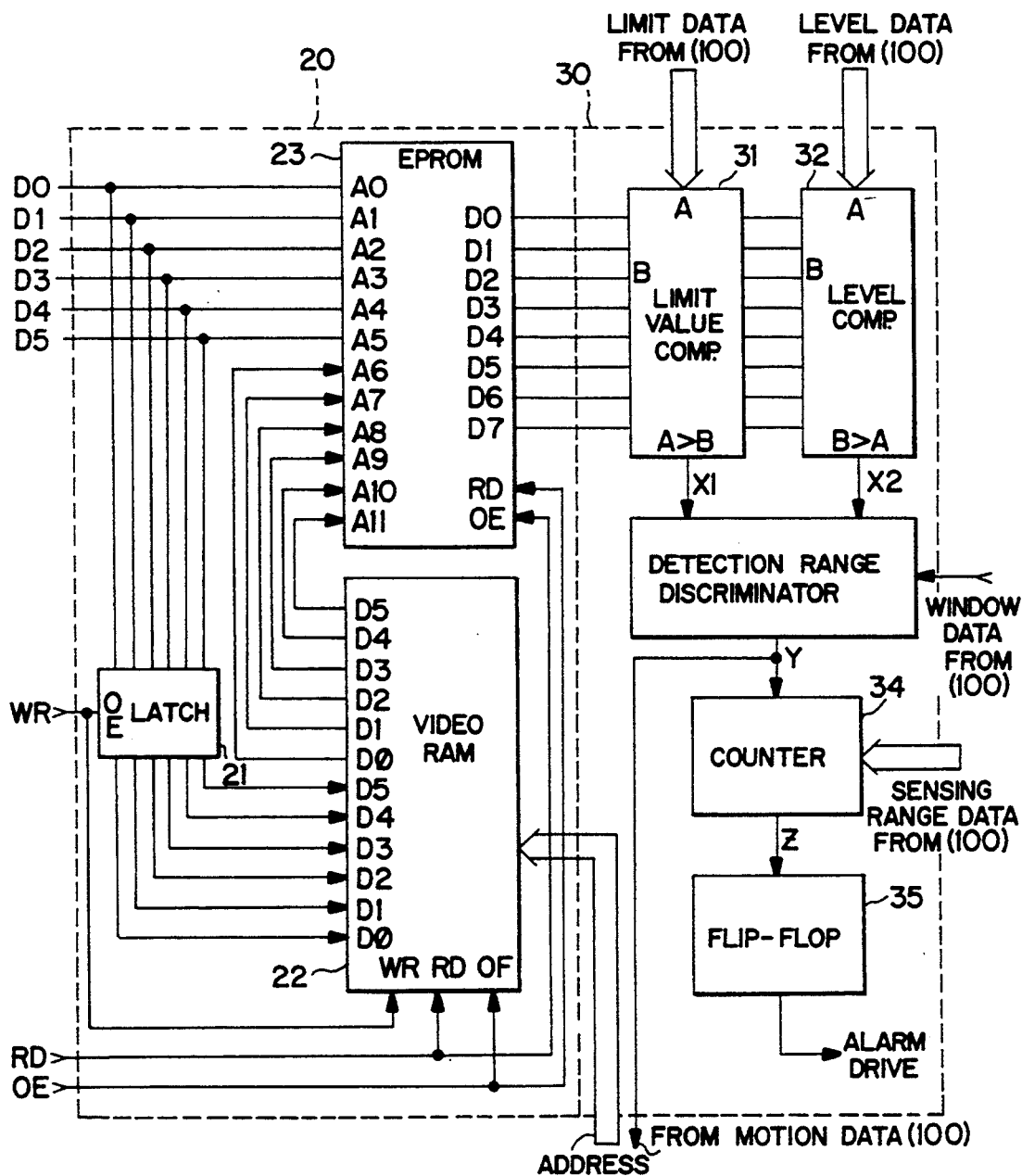
FIG. 8 is a diagram showing a picture memory and motion comparator section, a level comparator section and a motion output controller section of the motion detecting apparatus of the present invention.

The picture memory and motion comparator 20, as shown in FIG. 8, includes a latch 21 for latching video data from said analog/digital converter 10, a video RAM 22 for storing video data of one field from said latch 21 and outputting video data of previous field in response to the address generator 60, and an EPROM 23 for comparing video data of current field inputted from the analog/digital converter 10 with video data of previous field inputted from the video RAM and outputting a motion factor value in response to a difference obtained from said comparison.

The level comparing and motion output controller 30 includes a limit comparator 31 for outputting a first control signal X1 by comparing the motion factor value outputted from the picture memory and motion comparator 20 with the limit value outputted from the microcomputer 100, a level comparator 32 for outputting a second control signal X2 when the motion factor value is below the reference value by comparing the motion factor value outputted from the limit comparator 31 with the reference value outputted from the microcomputer 100, a detection range discriminator 33 for outputting motion data by decting an effective motion range within a monitoring area in response to the first and second control signals X1 and X2 of the limit comparator 31 and the level comparator 32 and the window data, a counter 34 for counting outputs from said detection range discriminator 33 in response to the detection range data of the microcomputer 100, and a flip-flop 35 for applying the outputs from the counter 34 to the alarm output controller.

Figure 7:
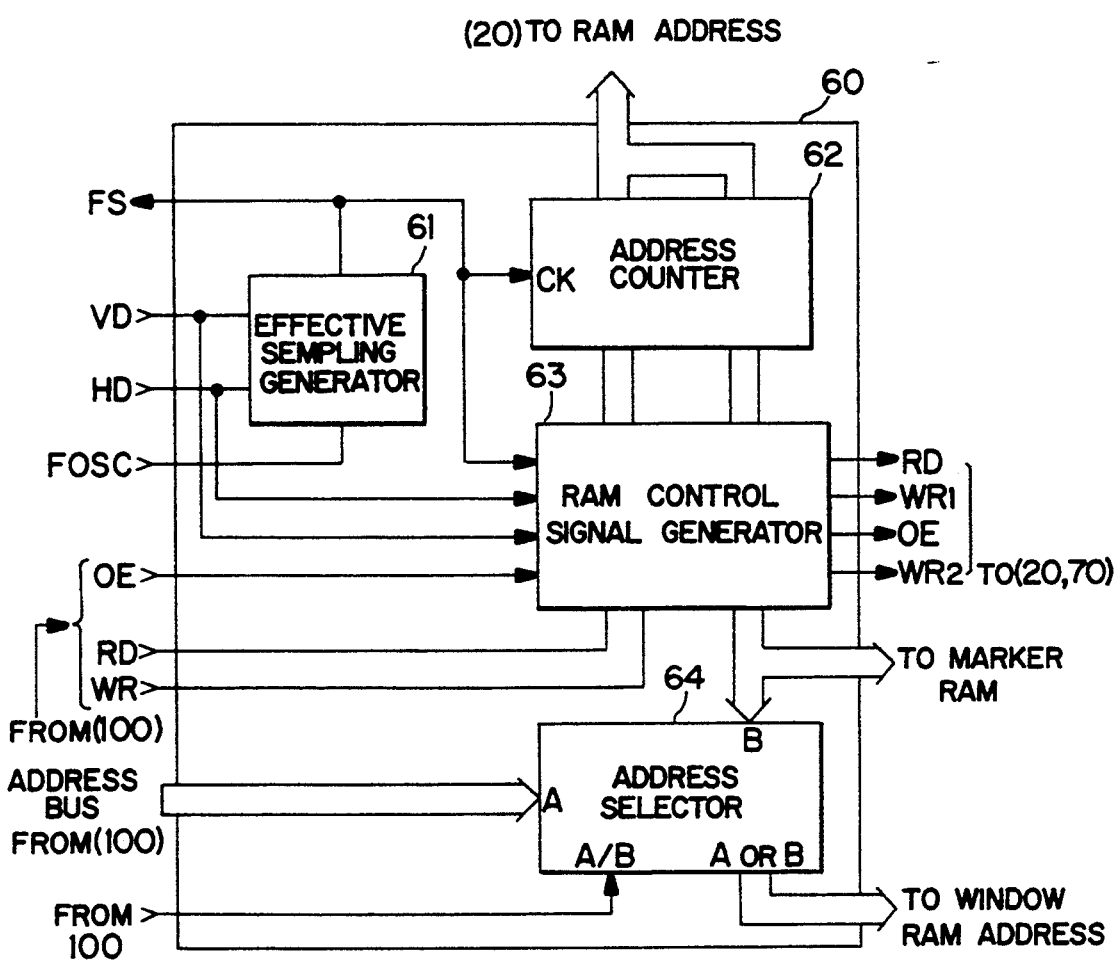
FIG. 7 is a diagram showing a memory control and address generator section of the motion detecting apparatus of the present invention.

The memory controlling and address generator 60, as shown in FIG. 7, includes an effective sampling range generator 61 for generating and applying an effective sampling signal (fs) to the analog/digital converter 10 in response to the clock signal of the system clock generator 90 and the horizontal and vertical synchronous signals of the synchronous separator 50, an address counter 62 for receiving and counting the effective sampling signals (fs) and outputting the counted signal as a RAM address signal of the picture memory and motion comparator 20, a RAM control signal generator 63 for receiving the address count signal of the address counter 62 and generating the control signal of the picture memory and motion comparator 20 and the marker RAM address of the window control and marker indication controller 70 in response to the horizontal and vertical synchronous signals and the control signal of the microcomputer 100, and an address selector 64 for selecting the window address of the microcomputer 100 or the address of the address counter 62 in response to the address selection signal of the microcomputer 100 and outputting the selected address as a window RAM address.

Figure 9:
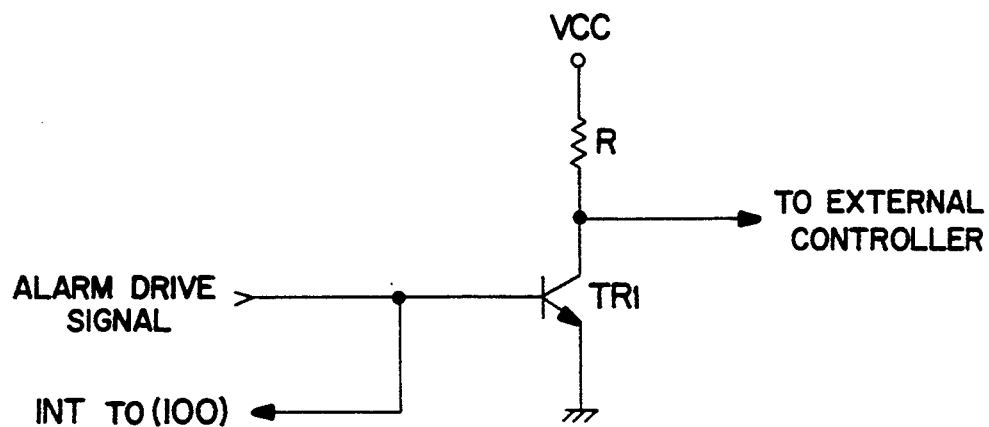
FIG. 9 is a diagram showing an alarm output controller section of the motion detecting apparatus of the present invention.

The alarm output controller 40 as shown in FIG. 9, is constructed such that it outputs an alarm drive signal, which is outputted when an effective motion is detected at the level comparing and motion output controller 30, as an interrupt signal of the microcomputer 100, receives the alarm drive signal at a base of a transistor TR1, and outputs the alarm drive signal, which is inverted by a collector of the transistor TR1, to an external controller.

Figure 10:
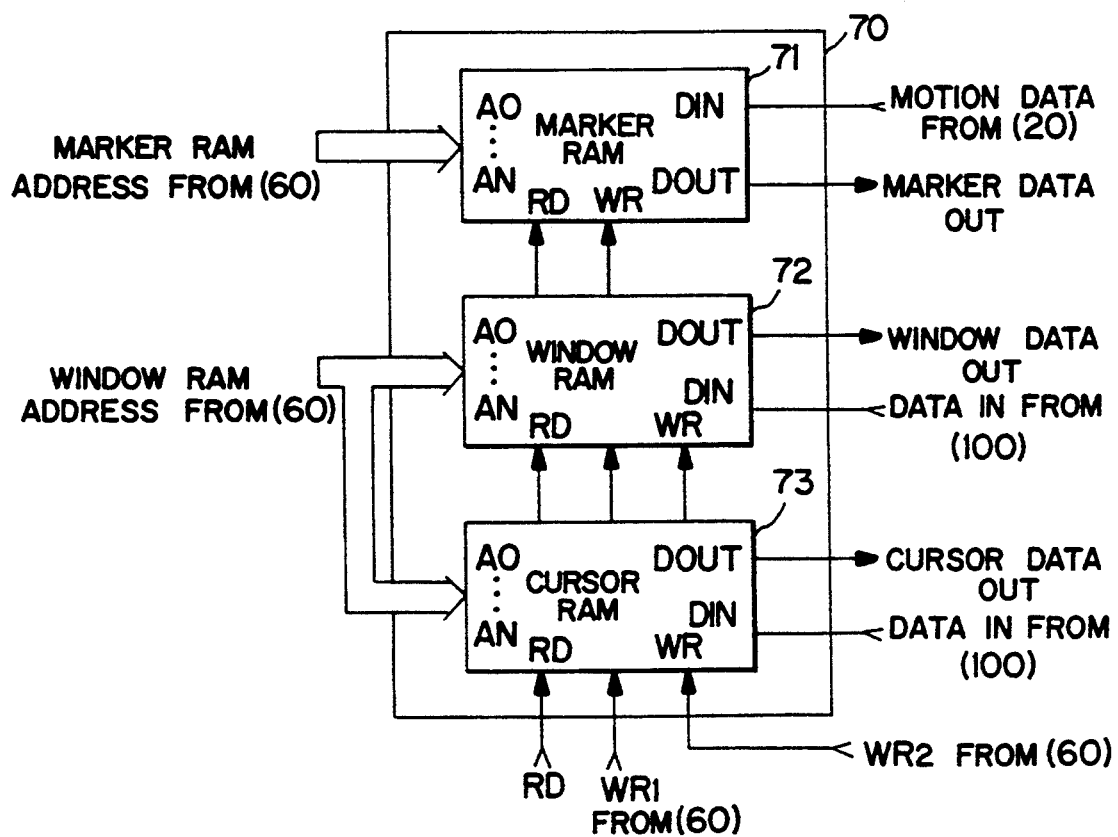
FIG. 10 is a diagram showing a window and marker indicator section of the motion detecting apparatus of the present invention.

The window control and marker indication controller 70, as shown in FIG. 10, includes a marker RAM 71 for receiving the marker address of the memory control and address generator 60 and the motion signal of the level comparing 30 and motion output controller and generating a marker signal indicating a motion sign, a window RAM 72 for outputting a window signal for informing a monitoring region in response to the window address of the memory control and address generator 60 and the control signal of the microcomputer 100, and a cursor RAM 73 for outputting cursor data in response to the address of the memory control and address generator 60 and the control signal of the microcomputer 100.

Figure 11:
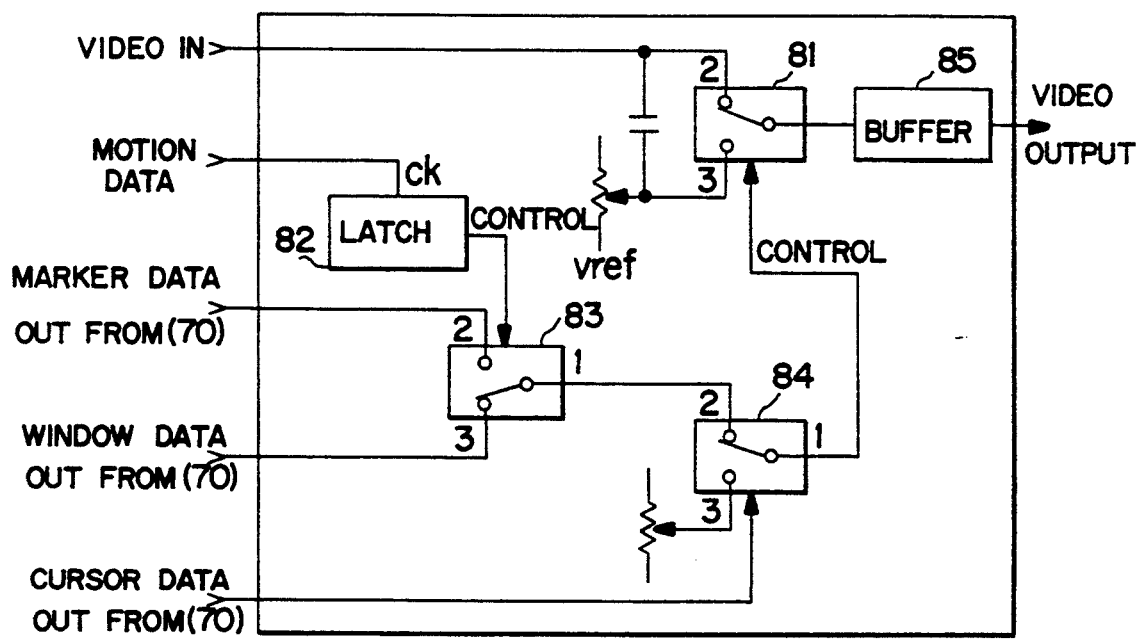
FIG. 11 is a diagram showing a picture synthesizer section of the motion detecting apparatus of the present invention.

The picture synthesizer 80, as shown in FIG. 11, includes a latch 82 for latching the motion data of the level comparing and motion output controller 30, a first switching unit 83 for selecting the marker data or the window data of the window control and marker indication controller 70 in response to the output signal of said latch 82, a second switching unit 84 for selecting the output signal of said first switching unit 83 or a predetermined reference voltage in response to the cursor data of the window control and marker indication controller 70, a third switching unit 81 for selectively switching the video input signal or the reference voltage in response to the output signals from said second switching unit 84, and a buffer 85 for buffering the output signals from said third switching unit and outputting the buffered signal as a video signal.

The motion detecting apparatus of the present invention operates as follows:

When a monitoring system is operated, video signals obtained from a CCD camera are inputted to the analog/digital converter 10, the synchronous separator 50 and the picture synthesizer 80, respectively.

The synchronous separator 50 separates the inputted video signal into a horizontal synchronous signal HD-SYNC and a vertical synchronous signal VD-SYNC. The separated signals are outputted to the effective sampling range generator 61 of the memory control and address generator 60.

The system clock oscillator 90 outputs a frequency signal (fosc) which is frequency-regulated by a variable resistor VR and oscillated at the quartz-crystal oscillator X-tel, to the memory control and address generator 60.

The system frequency signal (fosc) is synchronized with the horizontal and vertical synchronous signals at the effective sampling range generator 61 of the memory control and address generator 60 and is applied to the analog/digital converter 10 as an effective sampling frequency signal (fs).

Accordingly, the inputted video signal is synchronized with the effective sampling signal (fs) at the analog/digital converter 10 and is converted into digital data and then outputted to the picture memory and motion comparator 20.

The video data, which have been inputted to the picture memory and motion comparator 20, are compared with the video data of previous field and the video data of current field so that a factor value for a motion is calculated by the difference between the video data of previous field and the video data of current field. The motion factor value is inputted to the level comparing and motion output controller 30 so as to discriminate whether the motion factor value is within the limit value and the reference level range. When the motion factor value is accorded with the condition, an effective motion signal is outputted to the window control and marker indication controller 70.

And the motion signal is outputted to the alarm output controller 40 in order to carry out an alarm function in cooperation with an external appliance, and is applied as an interrupt signal of the microcomputer 100 so that the microcomputer 100 controls a window/marker indication in response to the motion detection.

The motion data, which have been applied to the window control and marker indication controller 70, are combined with the window data and marker data of the window RAM and marker RAM contained in the window control and marker indication controller 70, so that a marker signal MDO for indicating a marker of a predetermined magnitude at a position that a motion is produced is outputted.

The marker signal MDO is inputted to the picture synthesizer 80 so that the picture synthesizer 80 combines the video signal VI being currently inputted with the marker signal MDO to output an imposed marker of a predetermined level. At this moment, the output video signal VO is outputted in the form of being synthesized with the marker signal MDO.

At this moment, the memory control and address generator 60 outputs a sampling frequency (fs) using the synchronous signals VD and HD from the synchronous separator 50 and the clock signal (fosc) from the system clock oscillator 90 and applies the address signal AD, data DA, read and write signals RD and WR, and enable signal OE which are received from the microcomputer 100 to the picture memory and motion comparator 20.

The key board 110 is provided with various keys required to manipulate the motion detecting apparatus of the monitoring system so that a user may input a predetermined order to the microcomputer 100 through the keys.

The microcomputer 100 executes the orders inputted through the key board 110, outputs the address signal AD, data DA, read signal RD, write signal WR and enable signal OE to the memory control and address generator 60, and outputs the window/marker indication control signal to the window control and marker indication controller 70. Also, the microcomputer 100 outputs data such as a limit, a level and a sensing range to the level comparing and motion output controller 30.

For example, a user may execute an on/off operation of motion detection and a window edition by the key board 110. Such operations will be described in detail below.

When it is desired to turn on or turn off the motion detection operation, the microcomputer 100 outputs a low potential output enable signal OE so that the output enable signal OE of the EPROM 21 of the picture memory and motion comparator 20 becomes low potential. At this state, since no output signal is outputted from the EPROM 23, the motion detection operation is turned off.

On the other hand, when it is desired to execute a window edition, a desired window address is outputted through an address bus and is applied to the window control and marker indication controller 70 through the memory control and address generator 60 in order to select an address of the window RAM 72. At this moment, one bit data is applied to a data input terminal DIN of the window RAM 72 through a data bus so that a window is set at a desired address, thereby executing the window edition. At this moment, a write signal WR must be applied in high potential, as shown in FIG. 13A.

On the other hand, when the motion factor value which is detected at the picture memory and motion comparator 20 is compared with the limit value and reference level at the level comparing and motion output controller 30 and when it is discriminated that the motion is effective as a result of the comparison, an output signal is outputted from the counter 34 and the output signal triggers the flip-flop 35 so that a high potential signal is obtained from the flip-flop 35. The output signal from the flip-flop 35 is applied to the interrupt port INT of the microcomputer 100 so that the microcomputer 100 immediately outputs an output enable signal OE in low potential, thereby displaying the output of the marker RAM 71 of the window control and marker indication controller 70 on a screen.

Figure 12:
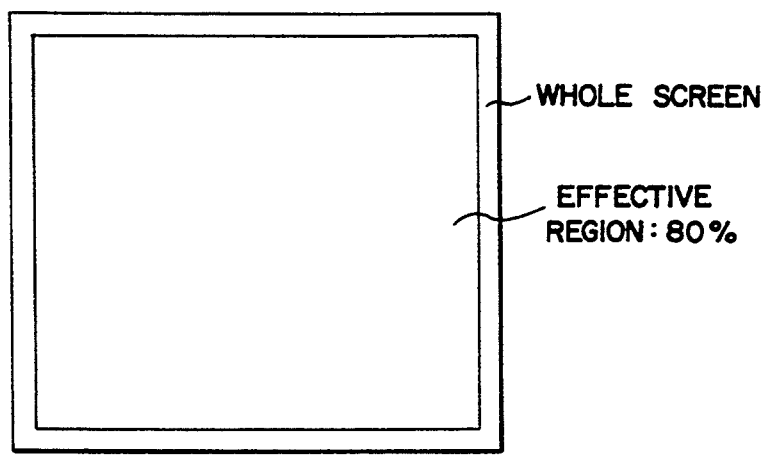
FIG. 12 is a diagram showing an effective region of the motion detecting apparatus of the present invention.

When vertical and horizontal synchronous signals VD and HD are applied to the effective sampling range generator 61 from the synchronous separator 50, the effective sampling range generator 61 outputs the sampling signal (fs) at an effective picture range which covers 80% of the whole screen, as shown in FIG. 12. Thus, the motion detection operation is carried out at the effective region. Accordingly, the sampling clock signal (fs) which is applied to the analog/digital converter 10 is outputted at the effective region and the input video signal is converted into digital data.

And, the sampling signal (fs) is applied also to the address counter 62 to produce a control address CAD of the video RAM 22 for recording picture data, as shown in FIG. 13G. That is, when the address counter 62 counts the sampling clock signal (fs), an address is generated and inputted to the video RAM 22 of the picture memory and comparator 20 and also inputted to the marker RAM 71 and the address selector 64.

And, the RAM control signal generator 63 receives the read signal RD and the write signal WR from the microcomputer 100 and combines the read and write signals RD and WR with the vertical and horizontal synchronous signals VD and HD in order to produce signals RD, WR1, WR2 and OE for the RAM control, That is, the control signals are generated in the timing of FIGS. 13A to 13I.

In addition, a window address produced by the microcomputer 100 and an address produced by the address counter 62 are applied to the address selector 64 and the addresses are selected and outputted by the address control signal of the microcomputer. That is, in case that the address control signal A/B is high potential, the address from the microcomputer 100 is selected and applied to the window RAM 72, while in case that the address control signal A/B is low potential, the address from the address counter 62 is selected and applied to the window RAM 72.

In the picture memory and motion comparator 20, the video data which have been outputted from the analog/digital converter 10 are applied to lower 6 bits (A0–A5) of the EPROM 23 and the previous video data which are outputted from the video RAM 23 are applied to the upper 6 bits (A6–A11) of the EPROM 23.

At this moment, the video data which are applied to the latch 21 are written in the video RAM 22 by one field. That is, when a write signal WR1, as shown in FIG. 13E, is applied to the output enable signal OE of the latch 21 and data of one field are applied to the video RAM 22, the address from the memory control and address generator 60 is applied to the video RAM 22 so that the video RAM 22 writes the video data of one field, as shown in FIG. 13G.

During the data are written in the video RAM 22, the EPROM 23 and the output enable port OE of the video RAM 22 become low potential so that no motion data are outputted from the EPROM 23.

After the write signals in series are outputted, as shown in FIGS. 13E and 13H, the output enable signal OE becomes high potential so that data are outputted from the EPROM 23 and the video RAM 22.

That is, when the output enable port OE of the video RAM 22 becomes high potential, data of one field are outputted and applied to upper addresses of the EPROM 23 and thus the EPROM 23 outputs motion factor values D0–D7.

The outputted motion factor values correspond to absolute value which is obtained by subtracting values A6–A11 from values A0–A6. These values are applied to an input port B of the limit comparator 31 and compared with a limit value A which has been set by the microcomputer 100. When the value is lower than the limit value A, a high signal is outputted from a port A>B.

For example, when the limit value A is 20, and the currently inputted motion factor value is lower than the limit value A, a high signal (X1="H") is outputted from the A>B port, while in the reverse condition, a low signal (X1="L") is outputted from the A>B port.

The level comparator 32 compares the motion factor value which is smaller than the limit value with the reference level data which have been set by the microcomputer 100. At this moment, when the motion factor value is larger than the reference value, a high signal (X2="H") is outputted from a B>A port of the level comparator 32, while in the reverse condition, a low signal (X2="L")is outputted from the B>A port of the level comparator 32.

Thereafter, the sensing range discriminator 33 outputs a high signal Y when both the signals X1 and X2 are high potential and the window data inputted from the window control and marker indication controller 70.

That is, the signals may be expressed as:

*X*1·*X*2·window data=*Y*.

The signal Y which is a motion data MD is applied to the window control and marker indication controller 70 and the picture synthesizer 80 and the number of signal Y is counted at the counter 34. When the counted value is larger than the sensing range value which is set by the microcomputer 100, a high output signal Z is outputted. This output signal is latched by the flip-flop 35 and continuously outputted as an alarm drive signal, so that the alarm output controller 40 is driven to control external appliances.

In the window control and marker indication controller 70, as shown in FIG. 10, the motion data MD are used as input data of the marker RAM 71 and the motion data are written in the marker RAM address which is outputted from the memory control and address generator 60. At this moment, the written range is a range that the control port WR1 is high potential. After the data are written, marker data are outputted every time the read port RD is high potential.

Thereafter, the marker data are applied to the second port of the first switching section 83 of the picture synthesizer 80. At this moment, when no motion data are present, a low signal is outputted from the latch 82 so that a port 3-1 is short-circuited and the window data are selected.

On the other hand, when it is not an editing mode, high signals are periodically applied to the read ports RD of the window RAM 72 and cursor RAM 73 and the write control port WR2 is maintained at low potential. And, at this moment, since the microcomputer 100 applies a low signal to the address port A/B, the port B is selected at the address selector 64 so that the address from the address counter 62 is outputted.

When editing a window, the microcomputer 100 outputs a high signal to the address control port A/B so that the address from the microcomputer 100 is selected at the address selector 64 and applied to the window RAM 72 and the cursor RAM 73. By the address and the data input DI outputted from the microcomputer 100, a monitioning range is determined and a high signal is written in the addresses of the window RAM 72 and the cursor RAM, which correspond to the monitoring range, while a low signal is written in the addresses, which do not correspond to the monitoring range. Accordingly, the addresses of the region which is edited by a user using the microcomputer 100 and the key board 110 are outputted as a window address and thus making it possible to edit the monitoring range.

And, when a low or high signal is written in the window address and the cursor address by the microcomputer, a flickering may be obtained so that the position being currently editing is indicated on the screen. That is, it is possible to indicate the window portion that is being edited by the cursor.

In the picture synthesizer 80, as shown in FIG. 11, the motion data MD obtained from the picture memory and motion comparator 20 are latched at the latch 82 so as to enable the control port C to be high potential and ports 2-1 of the first switching section 83 are connected to each other so as to enable the marker data outputted from the marker RAM 72 to be selected. While in case that no motion data is present, ports 1-3 are connected to each other so that the window data are selected.

Either the window data or the marker data is applied to the second port of the second switching section 84 and the ports 2-1 are connected to each other in case that no cursor signal is present so that the output signal of the first switching section 84 is selected and outputted to the control port of the third switching section 81. On the contrary, when a cursor signal is present, the ports 3-1 of the second switching section 84 are connected to each other so that the reference voltage Vref is selected and outputted to the control port C of the third switching section 81.

On the other hand, when a reference voltage is outputted from the second switching section 84, the ports 2-1 of the third switching section 81 are connected to each other so that the input video signal is selected and a composite video signal is outputted through the buffer 84. When one of marker, window or cursor signal from the second switching section 84 is present, the ports 3-1 or 2-1 are connected to each other so that a video signal is outputted through the buffer 84 in the form of being overlapped with the input video signal. That is, a composite video signal is overlapped with the input video signal is outputted.

In the above, the indication level of the window, marker and cursor signals may be adjusted by varying the reference voltage level of the third switching section 81.

As described above in detail, the present invention provides the effects that the region to be monitored may be edited and the selection and control of the sesing degree of motion are easily carried out. Also, the present invention provides the effect that when a motion is detected, an alarm is generated so that the supervisor may carry out the monitoring while executing other jobs.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A motion detecting apparatus, comprising:
    an analog/digital converter for sampling a video signal input from a charge-coupled device camera and converting the sampled signal into a digital signal;
    a synchronous separator for separating said sampled video signal into a horizontal synchronous signal and a vertical synchronous signal;
    a system clock generator for generating a system clock signal;
    a microcomputer for controlling motion detection, a window/marker indication and window editing in response to key signals from a keyboard;
    a memory control and address generator for receiving the horizontal synchronous signal and vertical synchronous signal from said synchronous separator and outputting an address signal and a control signal for determining an effective sampling region and a motion comparing region under control of said microcomputer;
    a picture memory comparator for receiving the digital video signal from said analog/digital converter and detecting motion of an image by comparing previously input field data and currently input field data under control of said memory control and address generator;
    a level comparing and motion output controller for comparing the motion of the image from said picture memory and motion comparator with a limit value and a reference value and controlling a motion output;
    an alarm output controller for outputting an alarm control signal to an external controller when said level comparing and motion output controller indicates the motion of the image exceeds the limit value;
    a window control and marker indication controller for controlling a window and a marker indication in response to an address signal, for designating a magnitude of a window/marker of said memory control and address generator, and a window/marker selection control signal of the microcomputer upon receipt of the motion output from the level comparing and motion output controller; and
    a picture synthesizer for synthesizing the motion output from said window control and marker indication controller and the video signal and outputting a video signal indicated with a window or a marker.

2. The apparatus of claim 1, wherein said picture memory and motion comparator includes:
    a latch for latching the digital video signal from said analog/digital converter;
    a video RAM for storing the currently input field data and outputting the previously input field data in response to said memory control and address generator; and
    an EPROM for comparing the currently input field data from said analog/digital converter with the previously input field data input from the video RAM and outputting a motion factor value in response to a difference obtained from said comparison.

3. The apparatus of claim 1, wherein said level comparing and motion output controller includes:
    a limit comparator for outputting a first control signal by comparing a motion factor value output from said picture memory and motion comparator with the limit value;
    a level comparator for outputting a second control signal when the motion factor value is less than the reference value by comparing the motion factor value with the reference value;
    a detection range discriminator for outputting motion data by detecting an effective motion range with a monitoring area in response to the first and second control signals of the limit comparator and the level comparator, respectively and window data;
    a counter for counting outputs from said detection range discriminator in response to detection range data from said microcomputer; and
    a flip-flop for applying the outputs from said counter to said alarm output controller.

4. The apparatus of claim 1, wherein said memory control and address generator includes:
    an effective sampling range generator for generating and applying effective sampling signals to said analog/digital converter in response to the system clock signal of said system clock generator and the horizontal and vertical synchronous signals of said synchronous separator;
    an address counter for receiving and counting said effective sampling signals and outputting a counted signal as a RAM address signal of said picture memory and motion comparator;
    a RAM control signal generator for receiving the RAM address signal of said address counter and generating the control signal of said picture memory and motion comparator and the address signal from said window control and marker indication controller in response to the horizontal and vertical synchronous signals and a control signal from said microcomputer; and
    an address selector for selecting a window address of the microcomputer or the RAM address signal from said address counter in response to an address selection signal from said microcomputer and outputting the selected address as a window RAM address.

5. The apparatus of claim 1, wherein said window control and marker indication controller includes:

a marker RAM for receiving a marker address from said memory control and address generator and the motion output of said level comparing and motion output controller and generating a marker signal indicating a motion sign;

a window RAM for outputting a window signal for forming a monitoring region in response to a window address of said memory control and address generator and a control signal from said microcomputer; and a cursor RAM for outputting cursor data in response to the address signal from said memory control and address generator and the control signal from said microcomputer.

6. The apparatus of claim 1, wherein said picture synthesizer includes;

a latch for latching the motion output of said level comparing and motion output controller;

a first switching unit for selecting the marker indication or the window of said window control and marker indication controller in response to an output signal of said latch;

a second switching unit for selecting an output signal of said first switching unit or a predetermined reference voltage in response to cursor data from said window control and marker indication controller;

a third switching unit for selectively switching the video signal or the predetermined reference voltage in response to an output signal from said second switching unit; and a buffer for buffering output signals from said third switching unit and outputting the buffered signal as the output video signal.

7. A motion detecting apparatus, comprising:

an analog/digital converter for sampling an input video signal and outputting a digital video signal;

a synchronous separator for separating a horizontal synchronous signal and a vertical synchronous signal from the digital input signal;

a system clock generator for generating a system clock signal;

editing means for receiving a previous frame and a current frame of the digital video signal, the horizontal synchronous signal, the vertical synchronous signal, and the system clock and for varying a size of a motion detection window by determining a difference between the previous frame and the current frame of the digital video signal; and a picture synthesizer for generating an output signal based on the size of the motion detection window.

8. The apparatus of claim 7, said editing means including, a memory control and address generator for receiving the horizontal synchronous signal and vertical synchronous signal from said synchronous separator and outputting an address signal and a control signal for determining an effective sampling region and a motion comparing region;

a picture memory and motion comparator for receiving the digital video signal from said analog/digital converter and for comparing the previous frame and the current frame to detect motion;

a level comparing and motion output controller for comparing the motion from said picture memory and motion comparator with a reference value to produce a motion output;

an alarm output controller for outputting an alarm control signal to an external controller when said level comparing and motion output controller indicates the motion of the image exceeds the reference value;

a window control and marker indication controller for controlling a window and a marker indication in response to the address signal, for designating a magnitude of a window/marker of said memory control and address generator, and a window/marker selection control signal upon receipt of the motion output from the level comparing and motion output controller; and microprocessor means for controlling said memory control and address generator, said picture means and motion comparator, said level comparing and motion output controller, said alarm output controller, and said window control and marker indicator controller;

wherein said picture synthesizer synthesizes the motion output from said window control and marker indication controller and the digital video signal and outputs a video signal indicating a window or a marker.

9. The apparatus of claim 8, wherein said picture memory and motion comparator includes:

a latch for latching the digital video signal from said analog/digital converter;

a video RAM for storing the current frame of the digital video signal and outputting the previous frame of the digital video signal in response to said memory control and address generator; and an EPROM for comparing the current frame of the digital video signal from said analog/digital converter with the previous frame of the digital video signal input from said video RAM and outputting a motion factor value in response to a difference obtained from said comparison.

10. The apparatus of claim 8, wherein said level comparing and motion output controller includes:

a limit comparator for outputting a first control signal by comparing a motion factor value output from said picture memory and motion comparator with the reference value;

a level comparator for outputting a second control signal when the motion factor value is less than the reference value;

a detection range discriminator for outputting motion data by detecting an effective motion range within a monitoring area in response to the first and second control signals of the limit comparator and the level comparator, respectively;

a counter for counting outputs from said detection range discriminator in response to detection range data from said microprocessor means; and a flip-flop for applying the outputs from said counter to said alarm output controller.

11. The apparatus of claim 8, wherein said memory control and address generator includes:

an effective sampling range generator for generating and applying effective sampling signals to said analog/digital converter in response to the system clock signal of said system clock generator and the horizontal and vertical synchronous signals of said synchronous separator;

an address counter for receiving and counting said effective sampling signals and outputting a counted signal as a RAM address signal of said picture memory and motion comparator;

a RAM control signal generator for receiving the RAM address signal of said address counter and generating the control signal of said picture memory and motion comparator and the address signal from said window control and marker indication controller in response to the horizontal and vertical synchronous signals and a control signal from said microprocessor means; and an address selector for selecting a window address of said microprocessor means or the RAM address signal from said address counter in response to an address selection signal from said microprocessor means and outputting the selected address as a window RAM address.

12. The apparatus of claim 8, wherein said window control and marker indication controller includes:

a marker RAM for receiving a marker address from said memory control and address generator and the motion output of said level comparing and motion output controller and generating a marker signal indicating a motion sign;

a window RAM for outputting a window signal for forming a monitoring region in response to a window address of said memory control and address generator and a control signal from said microprocessor means; and a cursor RAM for outputting cursor data in response to the address signal from said memory control and address generator and the control signal from said microprocessor means.

13. The apparatus of claim 8, wherein said picture synthesizer includes;

a latch for latching the motion output of said level comparing and motion output controller;

a first switching unit for selecting the marker indication or the window of said window control and marker indication controller in response to an output signal of said latch;

a second switching unit for selecting an output signal of said first switching unit or a predetermined reference voltage in response to cursor data from said window control and marker indication controller;

a third switching unit for selectively switching the digital video signal or the predetermined reference voltage in response to an output signal from said second switching unit; and a buffer for buffering output signals from said third switching unit and outputting the buffered signal as the output video signal.

14. A motion detecting apparatus, comprising:

memory control and address generator means for determining an effective sampling region and a motion comparing region and for outputting an address signal and a control signal;

picture memory and motion comparator means for detecting motion in an input signal by comparing a previous field of the input signal with a current field of the input signal and outputting a motion signal;

level comparing and motion output controller for comparing the motion signal with a limit value and outputting a alarm signal when the motion signal exceeds the limit value;

window control and marker indication controller for receiving the address signal and the motion signal and designating a window or a marker indication; and a picture synthesizer for outputting a window video signal or a marker video signal from the input signal and the window or marker indication.

15. The apparatus of claim 14, further comprising:

an analog/digital converter for sampling the input signal and outputting a digital signal;

a synchronous separator for separating a horizontal synchronous signal and a vertical synchronous signal from the digital signal; and a system clock generator for generating a system clock signal.

16. The apparatus of claim 15, wherein said picture memory and motion comparator includes:

a latch for latching the digital signal from said analog/digital converter;

a video RAM for storing the current field of the input signal and outputting the previous field of the input signal in response to said memory control and address generator means; and an EPROM for comparing the current field of the input signal from said analog/digital converter with the previous field of the input signal input from said video RAM and outputting a motion factor value in response to a difference obtained from said comparison.

17. The apparatus of claim 15, wherein said level comparing and motion output controller includes:

a limit comparator for outputting a first control signal by comparing a motion factor value output from said picture memory and motion comparator with the limit value;

a level comparator for outputting a second control signal when the motion factor value is less than the limit value by comparing the motion factor value with the limit value;

a detection range discriminator for outputting motion data by detecting an effective motion range with a monitoring area in response to the first and second control signals of the limit comparator and the level comparator, respectively;

a counter for counting outputs from said detection range discriminator in response to detection range data; and a flip-flop for applying the outputs from said counter to an alarm output controller.

18. The apparatus of claim 15, wherein said memory control and address generator means includes:

an effective sampling range generator for generating and applying effective sampling signals to said analog/digital converter in response to the system clock signal of said system clock generator and the horizontal and vertical synchronous signals of said synchronous separator;

an address counter for receiving and counting said effective sampling signals and outputting a counted signal as a RAM address signal of said picture memory and motion comparator;

a RAM control signal generator for receiving the RAM address signal of said address counter and generating the control signal of said picture memory and motion comparator and the address signal from said window control and marker indication controller in response to the horizontal and vertical synchronous signals; and an address selector for selecting a window address or the RAM address signal from said address counter in response to an address selection signal and outputting the selected address as a window RAM address.

19. The apparatus of claim 15, wherein said window control and marker indication controller includes:
- a marker RAM for receiving a marker address from said memory control and address generator means and the motion output of said level comparing and motion output controller and generating a marker signal indicating a motion sign;
- a window RAM for outputting a window signal for forming a monitoring region in response to a window address of said memory control and address generator and a control signal; and
- a cursor RAM for outputting cursor data in response to the address signal from said memory control and address generator means and the control signal.

20. The apparatus of claim 15, wherein said picture synthesizer includes;
- a latch for latching the motion output of said level comparing and motion output controller;
- a first switching unit for selecting the marker indication or the window of said window control and marker indication controller in response to an output signal of said latch;
- a second switching unit for selecting an output signal of said first switching unit or a predetermined reference voltage in response to cursor data from said window control and marker indication controller;
- a third switching unit for selectively switching the input signal or the predetermined reference voltage in response to an output signal from said second switching unit; and
- a buffer for buffering output signals from said third switching unit and outputting the buffered signal as an output signal.

* * * * *